United States Patent

Reisinger

[11] Patent Number: 5,803,477
[45] Date of Patent: Sep. 8, 1998

[54] BICYCLE FRAME CONSTRUCTION

[76] Inventor: Robert Reisinger, 2494 Victoria, Avenue, Calif. 93401

[21] Appl. No.: 525,333

[22] Filed: Sep. 7, 1995

[51] Int. Cl.$^6$ .................................................. B62K 11/00
[52] U.S. Cl. ......................... 280/284; 280/288; 280/275
[58] Field of Search ................................. 280/283, 284, 280/285, 281.1, 288, 275, 279

[56] References Cited

U.S. PATENT DOCUMENTS

| | | | |
|---|---|---|---|
| 618,627 | 1/1899 | Travis | 280/284 |
| 707,262 | 8/1902 | Sager et al. | 280/284 |
| 712,784 | 11/1902 | Ellis | 280/284 |
| 768,066 | 8/1904 | Morrow | 280/284 |
| 978,881 | 12/1910 | Harley | 280/284 |
| 1,142,344 | 6/1915 | Mackey | 280/284 |
| 1,167,699 | 1/1916 | Journell | 280/284 |
| 1,298,958 | 4/1919 | Johnston | 280/284 |
| 2,330,560 | 9/1943 | Descos | 280/288 |
| 2,433,631 | 12/1947 | Sherman | 280/288 |
| 4,813,591 | 3/1989 | Mueller et al. | 280/288 |
| 5,011,172 | 4/1991 | Bellanca et al. | 280/281.1 |
| 5,018,758 | 5/1991 | Klein | 280/281.1 |
| 5,129,665 | 7/1992 | Sutter et al. | 280/288 |
| 5,464,240 | 11/1995 | Robinson et al. | 280/281.1 |
| 5,476,278 | 12/1995 | Levin et al. | 280/288 |

FOREIGN PATENT DOCUMENTS

415499 A1  3/1991  European Pat. Off. ................. 70/14

*Primary Examiner*—Brian L. Johnson
*Assistant Examiner*—Gary Savitt
*Attorney, Agent, or Firm*—Leo F. Costello

[57] ABSTRACT

A bicycle frame which includes a strategically-located frame member which is basically a rigid member but which elastically deflects in limited amounts in one direction as it is subjected to increasing compressive forces applied along said direction especially during rough riding conditions but remains rigid and does not deflect when forces normally encountered in the handling and use of a bicycle are applied in other directions to such member. The frame member thus cushions the ride and improves traction while not adding weight or complexity to the frame. In the disclosed embodiment, the frame member is advantageously part of the seatstay and is thus between the seat tube and the rear drop-out. The seatstay incorporating the frame member elastically deflects or deforms under the imposition of sufficient oppositely directed forces of rider weight and ground reaction to absorb part of the force and to maintain traction between the wheel and the ground. Since the seatstay is basically rigid, it maintains the durability of the bike, but since it resiliently deforms under sufficient force, it cushions the ride and improves traction when most needed and without compromising rigidity and weight.

2 Claims, 4 Drawing Sheets

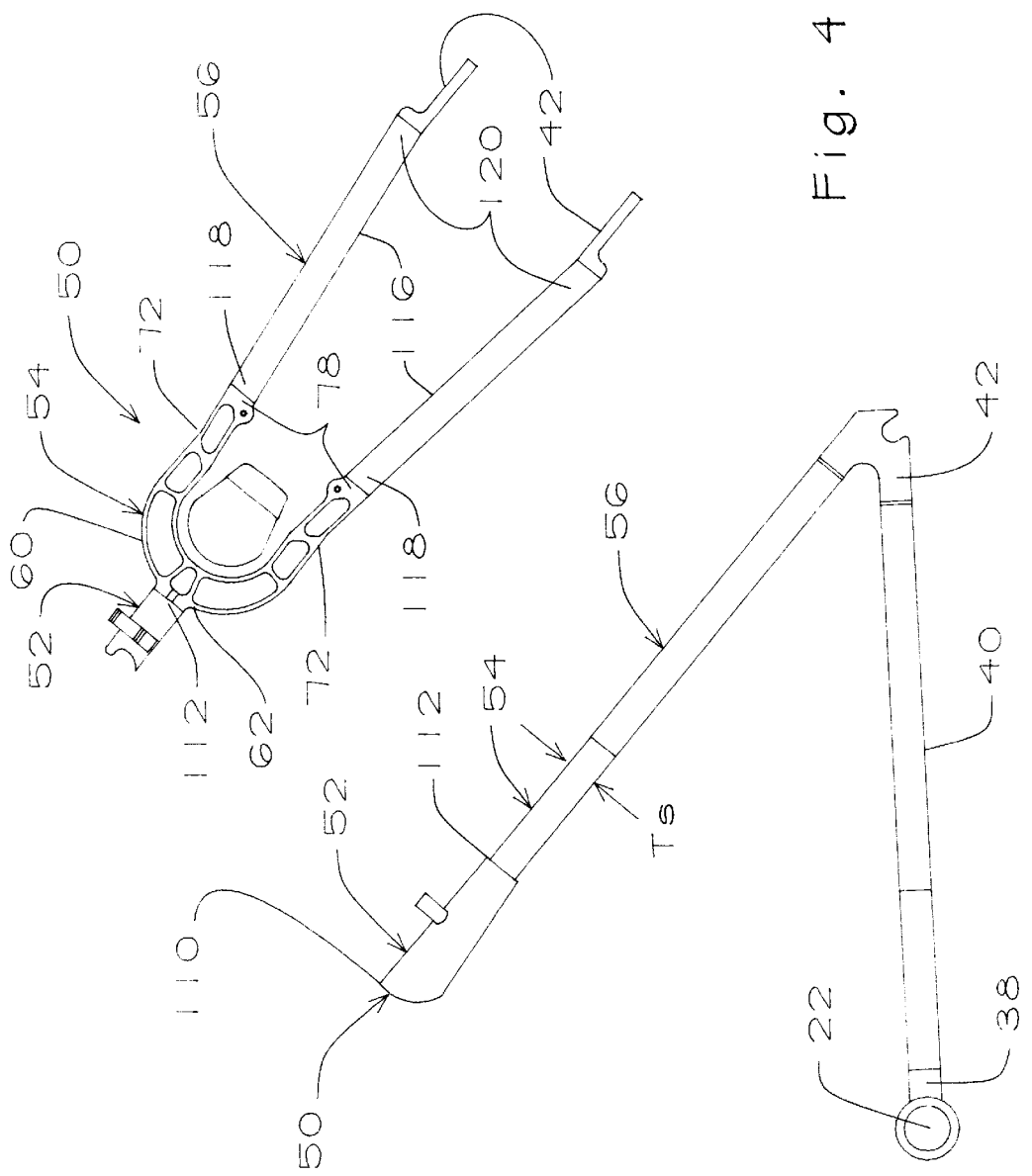

BICYCLE FRAME CONSTRUCTION

FIELD OF THE MENTION

This invention pertains to bicycle frame construction and more particularly to a bicycle frame which has both rigidity and shock-absorbing qualities.

BACKGROUND

It is well known that shock-absorption, rigidity, and weight are very important considerations in the design of a bicycle. The degree to which such qualities are incorporated in any particular bicycle depends in large measure on the type of bicycle and its intended use, for example, road and off-road bicycles and including cross-country, mountain, and downhill bicycles.

In most applications, however, these characteristics are in conflict with each other so that compromises have been necessary. Thus, although shock-absorbing suspension systems add comfort to a bicycle, the conventional systems also add weight and complexity and may reduce control in some applications. They also reduce rigidity, feel and handling ability. As a result, shock absorbers are not generally used unless shock-absorption is of paramount importance, such as in an off-road bike.

Even where suspension is considered essential, however, suspension systems typically involving springs, hydraulics and/or elastomers have been used primarily in the front end of the bicycle. Such conventional suspension systems have not been generally incorporated in the rear end because the disadvantage of the extra weight is more significant than the advantages of extra comfort and control. Thus, there has been a need for a shock-absorbing mechanism especially in the rear end of a bicycle, but also in other parts of the bicycle frame, which affords a measure of shock-absorption without adding weight or complexity to the frame

SUMMARY

The present invention involves a bicycle frame which includes a strategically-located frame member which is basically a rigid member but which elastically deflects in limited amounts in one direction as it is subjected to increasing compressive forces applied along said direction especially during rough riding conditions but remains rigid and does not deflect when forces normally encountered in the handling and use of a bicycle are applied in other directions to such member. The frame member thus cushions the ride and improves traction while not adding weight or complexity to the frame. In the disclosed embodiment, the frame member is advantageously part of the seatstay and is thus between the seat tube and the rear drop-out. The seatstay incorporating the frame member elastically deflects or deforms under the imposition of sufficient oppositely directed forces of rider weight and ground reaction to absorb part of the force and to maintain traction between the wheel and the ground. Since the seatstay is basically rigid, it maintains the durability of the bike, but since it resiliently deforms under sufficient force, it cushions the ride and improves traction when most needed and without compromising rigidity and weight.

An object of the present invention is to provide a bicycle frame with a suspension system without adding complexity or weight and without detracting from the effective rigidity and thus control of the bike.

Another object is to provide a simple, lightweight, one-piece suspension system which, although capable of resiliently deflecting under dynamic loading conditions, has no moving parts.

A further object is to improve the rideability and traction of a bicycle, especially for off-road applications.

Another object is to provide a bicycle frame member which is basically rigid, especially under relatively smooth riding conditions, but which elastically deforms in limited amounts when forces are increased on the member as riding conditions become more severe.

A still further object is to provide an elastically deformable bicycle frame member, which although exhibiting a spring constant and serving as a suspension system in the bicycle frame, is not a coil spring, thereby avoiding the complexity and maintenance associated with coil spring suspension systems.

Still another object is to provide a bicycle seatstay which has a normally rigid connection between the seat tube and the rear wheel of a bicycle but which resiliently flexes when sufficient forces are imposed by the weight of the rider acting downwardly along the seatstay and by the ground forces acting upwardly along the seatstay.

Another object is to provide a bicycle frame which incorporates an elastically flexible member which exhibits essentially unidirectional flexibility as contrasted with a coil spring which exhibits omnidirectional flexibility.

A further object is to provide a frame member in a bicycle which is made of metal or other suitable material which exhibits basic rigidity in opposition to forces applied in all directions against the member but which flexes resiliently in limited amounts when forces along a predetermined line are applied to the member, thereby to absorb a portion of such forces so as to improve traction and dampen shocks on the bicycle.

Yet another object is to provide a shock-absorbing and traction-enhancing bicycle frame which maintains bicycle rigidity and durability and which does not introduce added weight or complexity or detract from the appearance of the bike nor add maintenance since it has no moving parts in the normal sense.

An additional object is to absorb shocks and improve traction in a cross-country bicycle by introducing resilient flexibility into a portion of the frame of the bicycle and without using coil springs, hydraulics, elastomeric cushions, or the like.

These and other objects will become apparent upon reference to the accompanying drawings and the following description.

DESCRIPTION OF THE DRAWINGS

FIG. 3 is a still further enlarged side elevation of a portion of the rear triangle used in the frame shown in FIG. 2.

FIG. 4 is a plan view of the seatstay assembly of the rear triangle shown in FIG. 3 which includes an intermediate seatstay incorporating the principles of the present invention.

DETAILED DESCRIPTION

Figure 1:
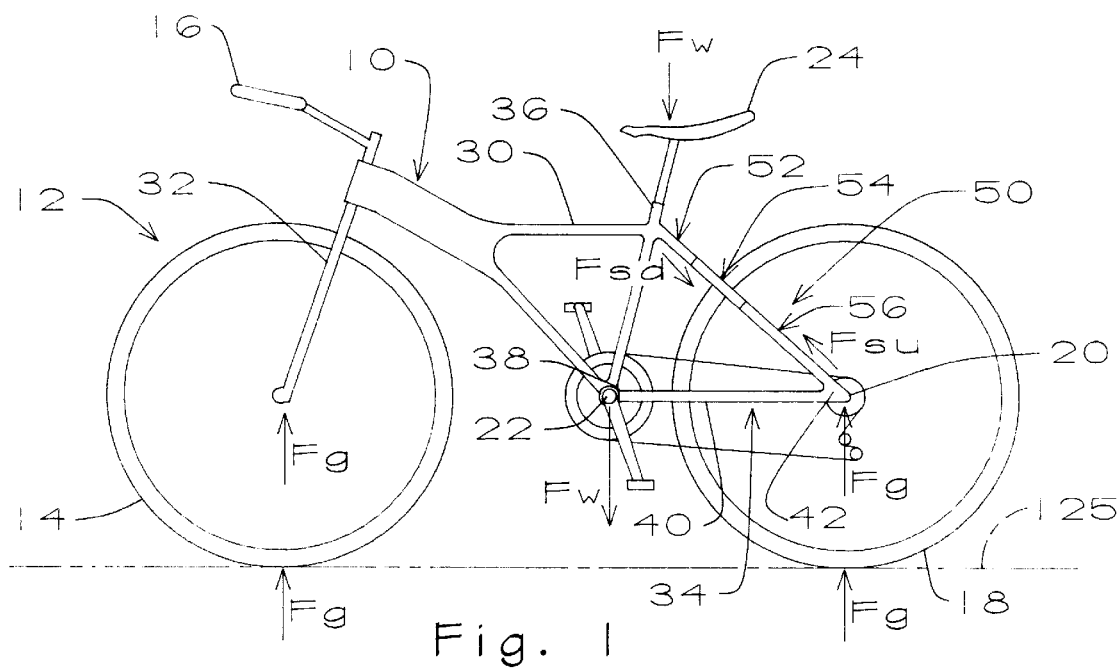
FIG. 1 is a fragmentary side elevation of a bicycle incorporating the frame construction of the present invention and showing certain forces which exist while riding the bicycle.

A frame 10 incorporating the principles of the present invention is shown in FIG. 1 as part of a bicycle 12. The frame is basically a rigid frame and is preferably made of an aluminum alloy such as 6061 aluminum or other suitable material including but not limited to carbon fiber, titanium, steel, or thermoplastic. Parts of the bicycle which do not directly pertain to the present invention are briefly identified as the front wheel 14, the steering headset 16, a rear wheel 18, a real axle 20, a crank axle 22, and a seat 24.

Furthermore, the bicycle 12 (FIG. 1) has a front mainframe section or triangle 30, a front fork 32, and a rear frame section or triangle 34. The rear triangle includes a telescopic seat tube 36 having inner and outer portions, a bottom bracket 38 at the lower end of the outer portion, and a chainstay 40 extending from the bottom bracket to a rear drop-out 42.

Figure 5:
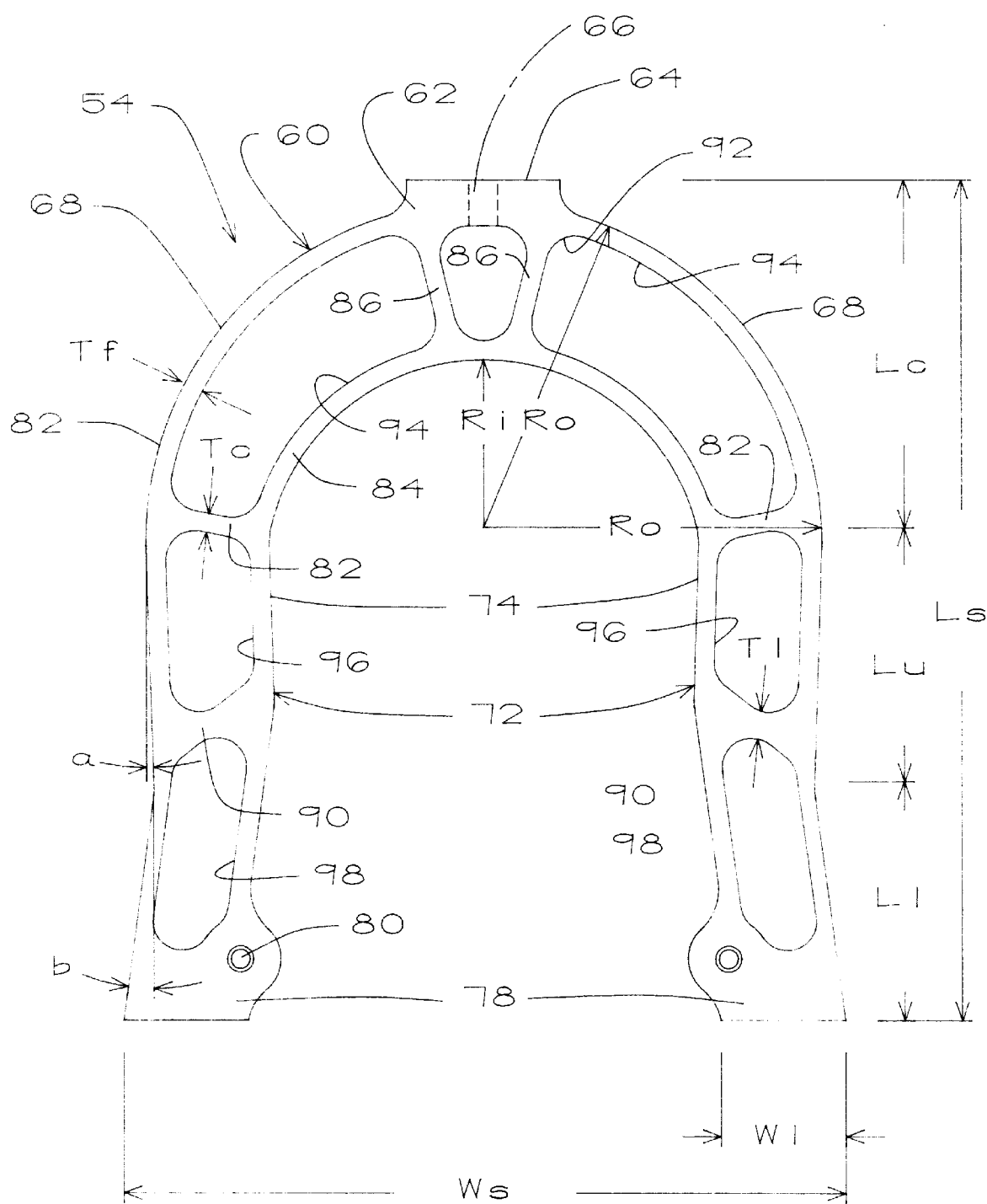
FIG. 5 is a full-scale plan view of the intermediate seatstay shown in FIG. 4 and illustrating in more detail structural features which embody the principals of the present invention.

The frame 10 also includes a seatstay assembly 50 (FIGS. 1–4) having an upper monostay 52, an intermediate seatstay 54, and a lower seatstay 56. The preferred embodiment of the intermediate seatstay (FIGS. 3, 4, and 5) is a lightweight, one-piece, wishbone-shaped, open-webbed construction which is best shown in the full-scale drawing in FIG. 5. The intermediate seatstay is preferably made from aluminum alloy, like the remainder of the frame 10, but like the rest of the frame can be made of other materials as noted above. Furthermore, it is preferably machined, but could be cast, extruded or forged into the shape illustrated. The intermediate seatstay has a smooth arcuate crown or bight 60 that has a central apex 62 with a flat upper end 64. A hole 66 is shown in the upper end and is provided for gas venting during heat treating of the part and for weight reduction in the seatstay. The crown also has a pair of smoothly curved shoulders 68 symmetrically extending outwardly and downwardly from the apex. The crown has an inside radius $R_i$ and an outside radius $R_o$.

The intermediate seatstay 54 (FIG. 5) also includes a pair of angulated legs 72 which are integral with the crown 60 and extend downwardly from the shoulders 68. Each leg has an upper portion 74 extending slightly inwardly from its respective shoulder 68 at an angle "a" and preferably also a lower portion 76 extending slightly outwardly from its upper portion at an angle "b." The legs terminate in lower ends 78 which have holes 80 for the purpose of mounting brakes, not shown and not part of the present invention. It is to be noted that the lower portions of the legs could be eliminated and the legs terminated at the lower ends of the upper portions.

The intermediate seatstay 54 (FIG. 5) has an overall length $L_s$, an overall width $W_s$, and a thickness $T_s$ (FIG. 3). Furthermore, the crown 60 (FIG. 5) has a length $L_c$, and the upper and lower portions 74 and 76 of the legs 72 have lengths identified by the characters $L_u$ and $L_l$, respectively. Still further, the lower end 78 of each leg 72 has a width $W_l$.

As stated, the intermediate seatstay 54 (FIG. 5) is of open-webbed construction to reduce weight and to enhance the resilient flexure as will be described. The seatstay 54 thus provides spaced inner and outer flanges 82 and 84 each of which has a thickness $T_f$. The flanges are connected by pairs of apex webs 86, shoulder webs 88, and leg webs 90. These webs are spaced along the crown 60 and the legs 72 at the described locations, thereby providing openings 92, 94, 96 and 98 in the intermediate seatstay. It will be noted that the inner and outer flanges gradually converge from the central apex 62 of the crown 60 toward the lower ends 78. More specifically, the inside radius $R_i$ is constant, but the outside $R_o$ decreases from the apex to the upper leg portions 74. The apex webs 86 and the shoulder webs 88 are of approximately the same thickness $T_c$, whereas the leg webs 90 have a slightly greater thickness $T_1$.

The upper monostay 52 (FIGS. 2–4 and 6) is tubular and tapers from an upper end 110 having an oval cross-section to a lower end 112 having a rectangular cross-section. The upper end 110 is connected, as by welding, to the outer portion of the seat tube 36, and the lower end 112 is connected, also by welding, to the central apex 62 of the crown 60 of the intermediate seatstay 54. The lower seatstay 56 includes a pair of legs 116 which are also tubular and of square cross-section. The legs have upper ends 118 connected to the lower ends 78 of the legs 72 of the intermediate seatstay and lower ends 120 connected to the rear drop-outs 42, all of such connections being formed by welding.

It is thus seen from the foregoing description that the frame 10 including the main frame section 30 as well as the entire rear frame section or rear triangle 34 is of basically rigid construction. More specifically, the seatstay assembly 50 provides a continuous, essentially one-piece, rigid connection between the seat tube 36 and the rear axle 20. The seatstay assembly remains rigid under relatively smooth riding conditions but affords a measure of resilient flexibility in the manner described below, when the bicycle 12 is traversing rough terrain.

Figure 6:
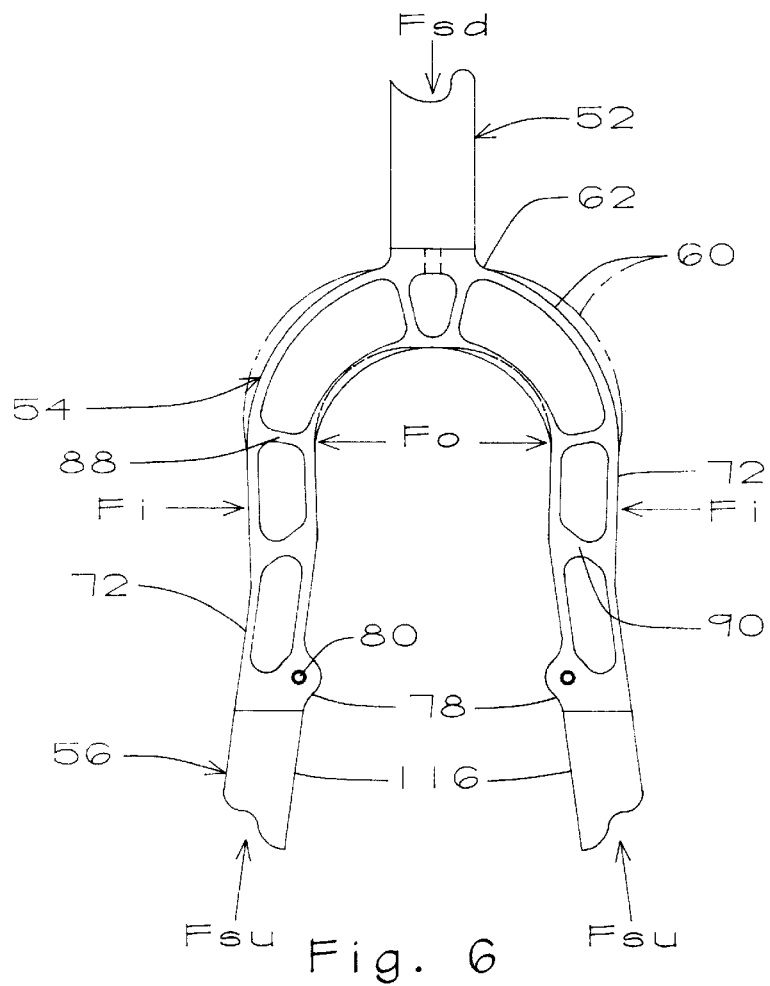
FIG. 6 is a fragmentary partially diagrammatic view of the seatstay assembly similar to FIG. 4 but showing certain forces which are imposed during riding of the bicycle and how these forces affect the intermediate seatstay.
Figure 2:
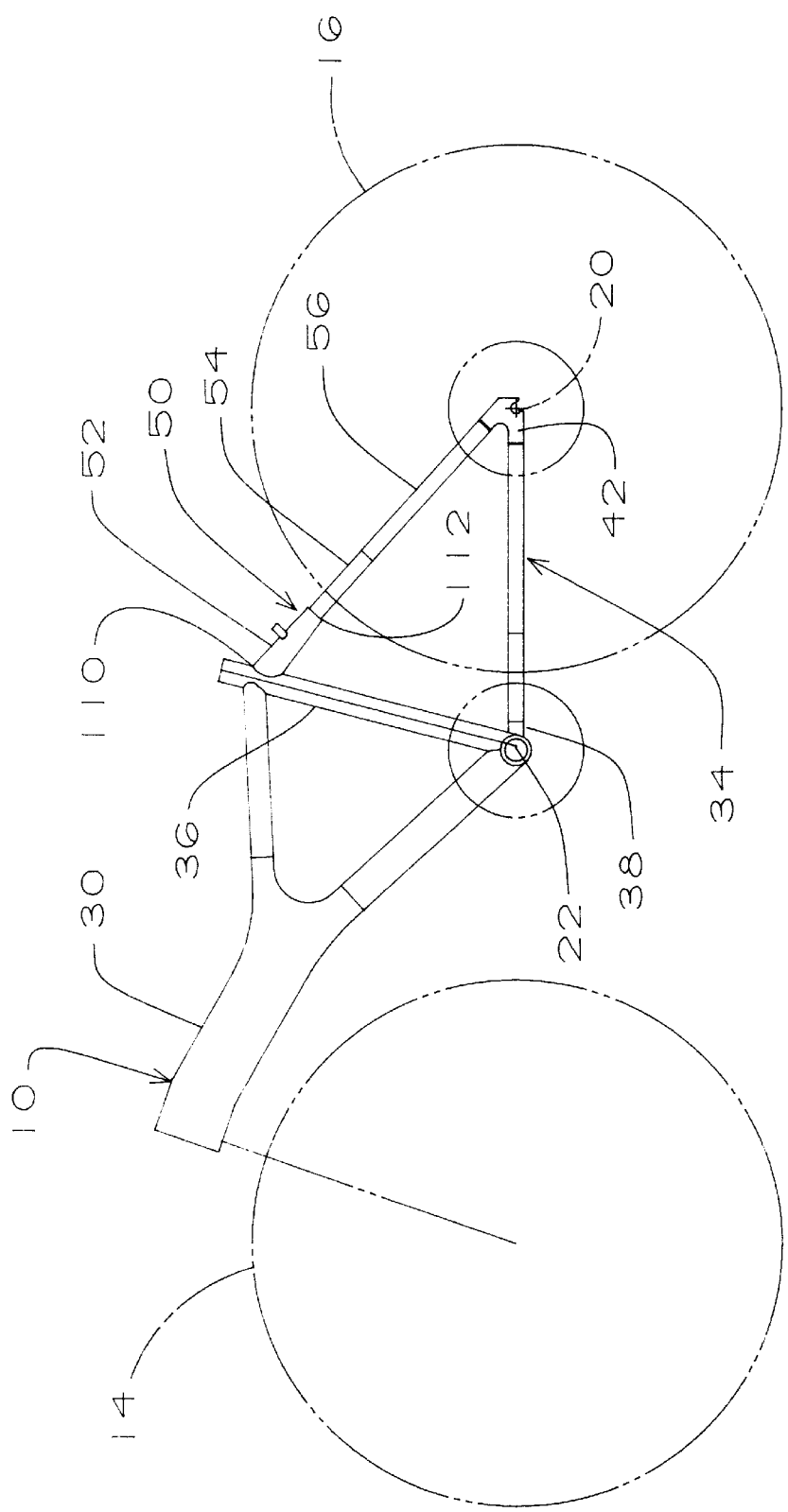
FIG. 2 is an enlarged side elevation of the frame used in the bicycle shown in FIG. 1 and with other parts of the bicycle being shown in phantom lines.

With reference particularly to FIGS. 1 and 6, certain forces are shown which are imposed on the bicycle 12, especially when it is traveling over rough ground or other surfaces 125. The weight of the rider is identified by the downwardly directed arrows $F_w$ and the upwardly directed reaction force of the ground on the rear wheel 18 is identified by the arrows $F_g$ in FIG. 1.

The forces $F_w$ and $F_g$ respectively have a component $F_{sd}$ (FIGS. 1 and 6) directed downwardly along the monostay 52 and components $F_{su}$ directed upwardly through the lower seatstay 56 to the legs 72 of the intermediate seatstay 54. The forces $F_{sd}$ and $F_{su}$ are applied in opposite directions respectively against the central apex 62 and the lower ends 78 of the legs 72. The opposing forces set up outwardly directed force components $F_o$ (FIG. 6) on the legs 72 at the location of the shoulder webs 88 and inwardly directed force components $F_i$ on the legs 72 at the location of the leg webs 90. Primarily, this causes the shoulders to bend slightly outwardly, with the outer flanges 84 flexing slightly more than the inner flanges 82, as shown in the phantom lines in FIG. 7. Also, though less perceptibly, the legs may bend slightly inwardly.

It is to be noted that the curvature of the shoulders 68 facilitates the outward flexing action since the pre-bent condition of the shoulder predisposes it to further bending when endward force is applied. This is to be contrasted with the unyielding rigidity that would occur if the shoulders were straight.

It will thus be understood that the forces $F_w$ and $F_g$ operating on the intermediate seatstay 54 (FIGS. 1 and 6) causes the latter to flex resiliently and thereby to absorb and cushion the shocks of these forces on the rider while at the same time tending to maintain traction of the rear wheel 18 on the ground 125. Although the intermediate seatstay is of very rigid construction, it has the characteristic of resilient flexibility lenghtwise of the seatstay 54 under dynamic, riding conditions so as to provide the desired shock absorption and traction enhancement. The intermediate seatstay exhibits basic rigidity against forces applied against it in all directions, but it can elastically deform in limited amounts in one direction, namely, the longitudinal direction of the seatstay. Thus, the intermediate seatstay is referred to as having essentially unidirectional elastic or resilient flexibility, as contrasted with a coil spring which has omnidirectional flexibility or lack of rigidity.

The resilient or elastic flexibility of the seatstay assembly 50 (FIG. 6) and especially the intermediate seatstay 54 in actual use can be simulated in an arbor press. To perform such simulation, the intermediate seatstay is placed in an arbor press, not shown, between its lower ends 78 and upper flat end 64 and subjected to increasing compression in the order of approximately 200 pounds initial force to approximately 350 pounds. This application of force causes the upper flat end 64 to move downwardly about ⅛" and the shoulders to flex out as illustrated in phantom lines in FIG. 6. Although under dynamic loading, peak loads may exceed 350 pounds, these peak loads are of short duration and therefore impose only a fraction of the value into the system. Moreover, the spring constant of the intermediate seatstay 54 is high enough that small forces, that is, forces of low magnitude, are not sufficient to flex the seatstay, thereby maintaining a rigid frame 10 and feel to the rider.

Upon removal of the compressive forces in the arbor press in the simulated test, the flat upper end 64 and the shoulders 68 return to their original static shape, as shown in solid lines in FIG. 6. This test may be repeated many times with the same action occurring thus demonstrating on the test bench what is actually occurring in the dynamics of a ride.

Thus, the intermediate seatstay 54 provides a very rigid part of the overall seatstay assembly 50 and frame 10. The deflection that does occur in the intermediate seatstay under riding conditions is unidirectional and lengthwise of the intermediate seatstay, whereas the intermediate seatstay does not have such flexibility and thus remains rigid under the imposition of forces applied trasversely of the seatstay. As the forces on the bicycle increase, the intermediate seatstay 54 flexes correspondingly and just enough to cushion shocks and maintain traction without destroying or compromising rigidity and control. Even in its flexed condition, the frame still has considerable rigidity.

Although the action of the essentially rigid but partially resiliently flexible intermediate seatstay 54 can be proven on the test bench as described above, use of the bicycle 12 incorporating this intermediate seatstay, especially by expert test riders, has proven the principles in actual operation. Such test riders attest that the frame construction in fact offers a forgiving ride that does not pound the rider even though mere observation of the frame in general and the seatstay assembly in particular caused such riders to believe that the frame would deliver a rough and rigid ride.

Although the preferred embodiment of the invention has been shown and described as the wishbone-shaped intermediate seatstay 54 (FIG. 5), it will be understood that other embodiments could be utilized without departing from the spirit and scope of the present invention. It will be recognized that the shoulders 68 and angulated legs 72 act in the manner of arcuate leaf springs joining the apex 62 and the lower seatstay legs 116, so that other configurations of these members could be devised to provide the described flexing action. For example, instead of the intermediate seatstay 54, an alternative is a wavy or serpentine seatstay, not shown, of material like the seatstay 54, incorporated in the seatstay assembly in line with the force components $F_{sd}$ and $F_{su}$, so that such a serpentine seatstay will compress and expand accordian-like and unidirectionally under the imposition of these force components and thereby absorb shocks and maintain traction similarly to the shoulders 68 and legs 72.

Although a preferred embodiment of the present invention has been shown and described, various modifications and substitutions, such as that noted above, may be made thereto without departing from the spirit and scope of the invention. Accordingly, it is to be understood that the present invention has been described by way of illustration and not limitation.

What is claimed is:

1. A seatstay assembly for interconnecting a seat tube and rear wheel of a bicycle, comprising:

a wishbone-shaped intermediate seatstay including an arcuate upper crown having a central apex and a pair of shoulders on opposite sides of the apex and a pair of angulated legs integral with and extending downwardly from said shoulders, said crown being curved about an axis that is transverse to the legs, said legs having upper portions extending from said shoulders convergently inwardly toward each other and lower portions extending from said upper portions divergently outwardly away from each other, said legs and crown being formed by inner and outer flanges joined by a plurality of webs spaced lengthwise of the seatstay and located at said apex, at the juncture of said shoulders and upper leg portions, and at the juncture of said upper and lower leg portions, said webs and flanges defining openings through the intermediate seatstay;

said flanges having width dimensions that extend generally parallel to said axis and thickness dimensions that extend transversely of said axis, said width dimensions being greater than said thickness dimensions;

a rigid tubular upper seatstay interconnecting the apex of the crown and the seat tube; and a pair of rigid tubular lower seatstays interconnecting the lower ends of the lower portions of said legs and the rear wheel.

2. The frame of claim 1, wherein the upper, intermediate and lower seatstays are made of aluminum.

\* \* \* \* \*